(12) United States Patent
Hatakenaka et al.

(10) Patent No.: US 9,584,010 B2
(45) Date of Patent: Feb. 28, 2017

(54) POWER SUPPLY APPARATUS

(71) Applicant: DENSO CORPORATION, Kariya, Aichi-pref. (JP)

(72) Inventors: Kenta Hatakenaka, Obu (JP); Katsutoyo Misawa, Kariya (JP); Yuuichi Handa, Anjo (JP); Yuuki Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 14/680,209

(22) Filed: Apr. 7, 2015

(65) Prior Publication Data

US 2015/0288276 A1    Oct. 8, 2015

(30) Foreign Application Priority Data

Apr. 8, 2014  (JP) ................................. 2014-079439

(51) Int. Cl.
*H02M 1/44*  (2007.01)
*H02M 3/335*  (2006.01)
(Continued)

(52) U.S. Cl.
CPC .............. *H02M 1/44* (2013.01); *H02M 3/28* (2013.01); *H02M 3/337* (2013.01);
(Continued)

(58) Field of Classification Search
CPC ...... H02M 1/44; H02M 3/28; H02M 3/33569; H02M 3/337; H01F 2027/2861;
(Continued)

(56) References Cited

U.S. PATENT DOCUMENTS 8,488,316 B2* 7/2013 Zeng .................. H02M 7/003
257/666
8,614,616 B2* 12/2013 Willkofer ................ H01L 23/48
29/602.1

(Continued)

FOREIGN PATENT DOCUMENTS

JP    2007-221919    8/2007

*Primary Examiner* — Fred E Finch, III
*Assistant Examiner* — Demetries A Gibson
(74) *Attorney, Agent, or Firm* — Nixon & Vanderhye P.C.

(57) ABSTRACT

A power supply apparatus includes a transformer which has a primary coil and a secondary coil, a primary side semiconductor component which configures a primary side circuit connected to a side of the primary coil of the transformer, a secondary side semiconductor component which configures a secondary side circuit connected to a side of the secondary coil of the transformer, a choke coil which is connected to the secondary side semiconductor component, and a base plate on which the transformer, the primary side semiconductor component, the secondary side semiconductor component, and the choke coil are mounted. Any two of the transformer, the primary side semiconductor component, the secondary side semiconductor component, and the choke coil configure a first stacked body stacked in a normal direction of the base plate, and other two of the transformer, the primary side semiconductor component, the secondary side semiconductor component, and the choke coil configure a second stacked body stacked in the normal direction of the base plate. The power supply apparatus has a pair of first lines connecting the primary side semiconductor component and the transformer to each other, and a pair of second lines connecting the transformer and the secondary side semiconductor component to each other. The first lines and the second lines respectively have a pair of first current paths and a pair of second current paths which are arranged so as to be adjacent to each other and are configured so that (Continued)

currents flow in the normal direction of the base plate. At least one of the pair of the second current paths is adjacent to at least one of the pair of the first current paths in a second direction orthogonal to a first direction in which the pair of the first current paths are adjacent to each other. The first current paths and the second current paths adjacent to each other in the second direction are configured so that currents flow therethrough in directions opposite to each other.

6 Claims, 8 Drawing Sheets

(51) Int. Cl.
  *H02M 3/28* (2006.01)
  *H02M 3/337* (2006.01)
  *H01F 27/30* (2006.01)
  *H01F 27/28* (2006.01)
(52) U.S. Cl.
  CPC ..... *H02M 3/33569* (2013.01); *H01F 27/2847* (2013.01); *H01F 27/303* (2013.01); *H01F 27/306* (2013.01)

(58) Field of Classification Search
  CPC .. H01F 27/2847; H01F 27/303; H01F 27/306; H01F 27/327
  See application file for complete search history.

(56) References Cited

U.S. PATENT DOCUMENTS

| | | | | |
|---|---|---|---|---|
| 2002/0001210 | A1* | 1/2002 | Kuranuki | H02M 3/3376 363/98 |
| 2010/0237977 | A1* | 9/2010 | Ikezawa | H01F 27/2847 336/232 |
| 2012/0099346 | A1* | 4/2012 | Bertilsson | H02M 3/33523 363/21.09 |
| 2013/0301312 | A1* | 11/2013 | Konishi | H02M 3/337 363/21.15 |
| 2014/0009971 | A1* | 1/2014 | Itou | H02M 3/33507 363/21.01 |
| 2015/0029757 | A1* | 1/2015 | Kurauchi | H02M 3/335 363/16 |
| 2015/0029759 | A1* | 1/2015 | Takemoto | B60L 11/00 363/17 |

* cited by examiner

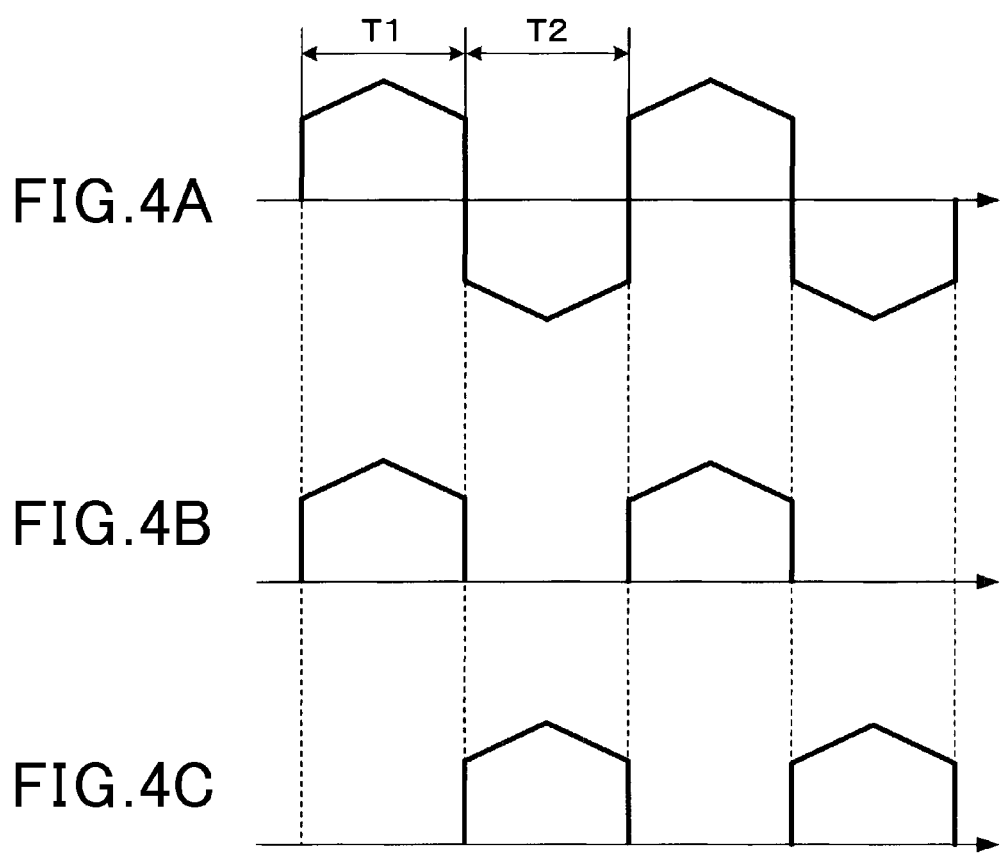

POWER SUPPLY APPARATUS

CROSS-REFERENCE TO RELATED APPLICATION

This application is based on and claims the benefit of priority from earlier Japanese Patent Application No. 2014-79439 filed Apr. 8, 2014, the description of which is incorporated herein by reference.

BACKGROUND

Technical Field

The present invention relates to a power supply apparatus including a transformer.

Related Art

A power supply apparatus such as a DC-DC converter has a transformer, a primary side semiconductor component connected to a primary coil side of the transformer, a secondary side semiconductor component connected to a secondary coil side of the transformer, and a choke coil connected to the secondary semiconductor component. These components are mounted on a base plate, and are arranged in the extension direction of the base plate (refer to JP-A-2007-221919).

However, when the transformer, the primary side semiconductor component, the secondary side semiconductor component, and the choke coil are arranged in the extension direction of the base plate, the power supply apparatus increases in size in the extension direction of the base plate. Hence, it can be considered that groups of two of the transformer, the primary side semiconductor component, the secondary side semiconductor component, and the choke coil are mounted on the base plate in a state where the two of the transformer, the primary side semiconductor component, the secondary side semiconductor component, and the choke coil are stacked in the normal direction of the base plate. Accordingly, two stacked bodies are closely arranged to decrease a space of the base plate where the components are mounted, which can decrease the power supply apparatus in size.

However, when forming the two stacked bodies and mounting them on the base plate, connection lines connecting between the components are easily close to each other. Hence, due to wiring arrangement of the connection lines, magnetic fluxes produced from the connection lines interfere with each other, which may easily produce large electromagnetic noise.

SUMMARY

An embodiment provides a power supply apparatus which can decrease in size while reducing electromagnetic noise.

A power supply apparatus of the embodiment includes: a transformer which has a primary coil and a secondary coil; a primary side semiconductor component which configures a primary side circuit connected to a side of the primary coil of the transformer; a secondary side semiconductor component which configures a secondary side circuit connected to a side of the secondary coil of the transformer; a choke coil which is connected to the secondary side semiconductor component; and a base plate on which the transformer, the primary side semiconductor component, the secondary side semiconductor component, and the choke coil are mounted. Any two of the transformer, the primary side semiconductor component, the secondary side semiconductor component, and the choke coil configure a first stacked body stacked in a normal direction of the base plate, and other two of the transformer, the primary side semiconductor component, the secondary side semiconductor component, and the choke coil configure a second stacked body stacked in the normal direction of the base plate. The power supply apparatus has a pair of first lines connecting the primary side semiconductor component and the transformer to each other, and a pair of second lines connecting the transformer and the secondary side semiconductor component to each other. The first lines and the second lines respectively have a pair of first current paths and a pair of second current paths which are arranged so as to be adjacent to each other and are configured so that currents flow in the normal direction of the base plate. At least one of the pair of the second current paths is adjacent to at least one of the pair of the first current paths in a second direction orthogonal to a first direction in which the pair of the first current paths are adjacent to each other. The first current paths and the second current paths adjacent to each other in the second direction are configured so that currents flow therethrough in directions opposite to each other.

BRIEF DESCRIPTION OF THE DRAWINGS

In the accompanying drawings:

FIGS. 4A, 4B, and 4C are explanatory drawings showing current waveforms flowing through current paths, according to the first embodiment;

DETAILED DESCRIPTION OF THE PREFERRED EMBODIMENTS

Figure 1:
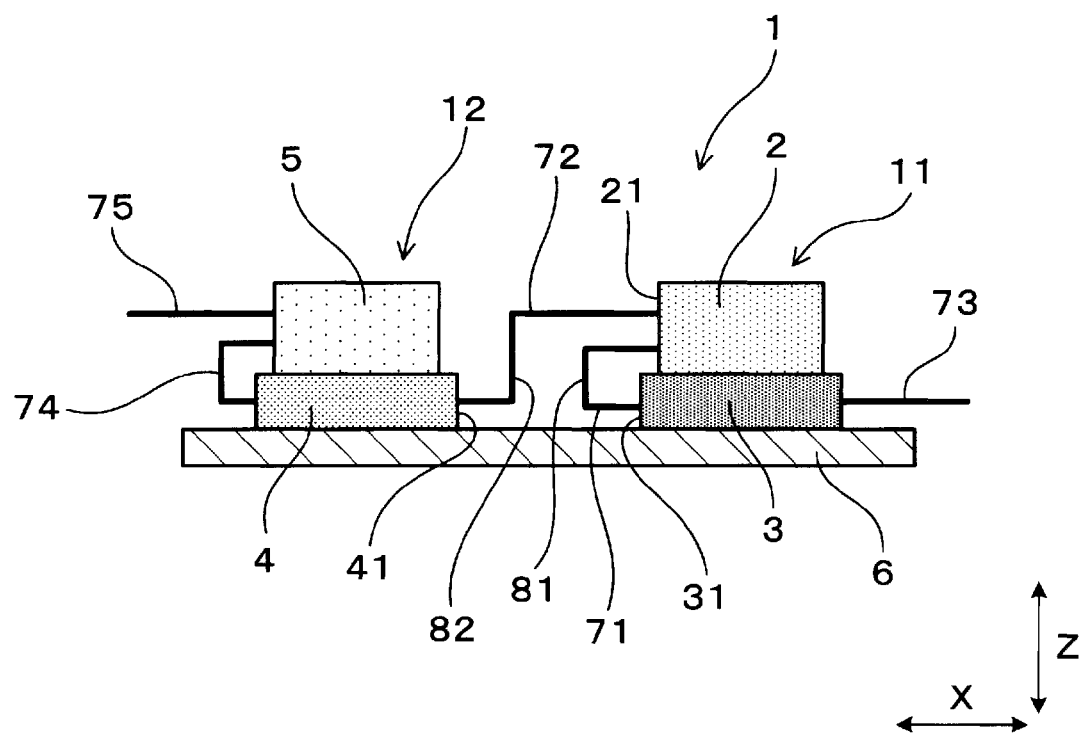
FIG. 1 is an explanatory drawing of a power supply apparatus viewed in the direction parallel to a base plate, according to a first embodiment.

With reference to the accompanying drawings, hereinafter are described some embodiments of the present invention. It should be noted that, in the following embodiments, the components identical with or similar to each other between the embodiments are given the same reference numerals.

First Embodiment

An embodiment of the power supply apparatus is described with reference to FIGS. 1 to 5.

Figure 2:
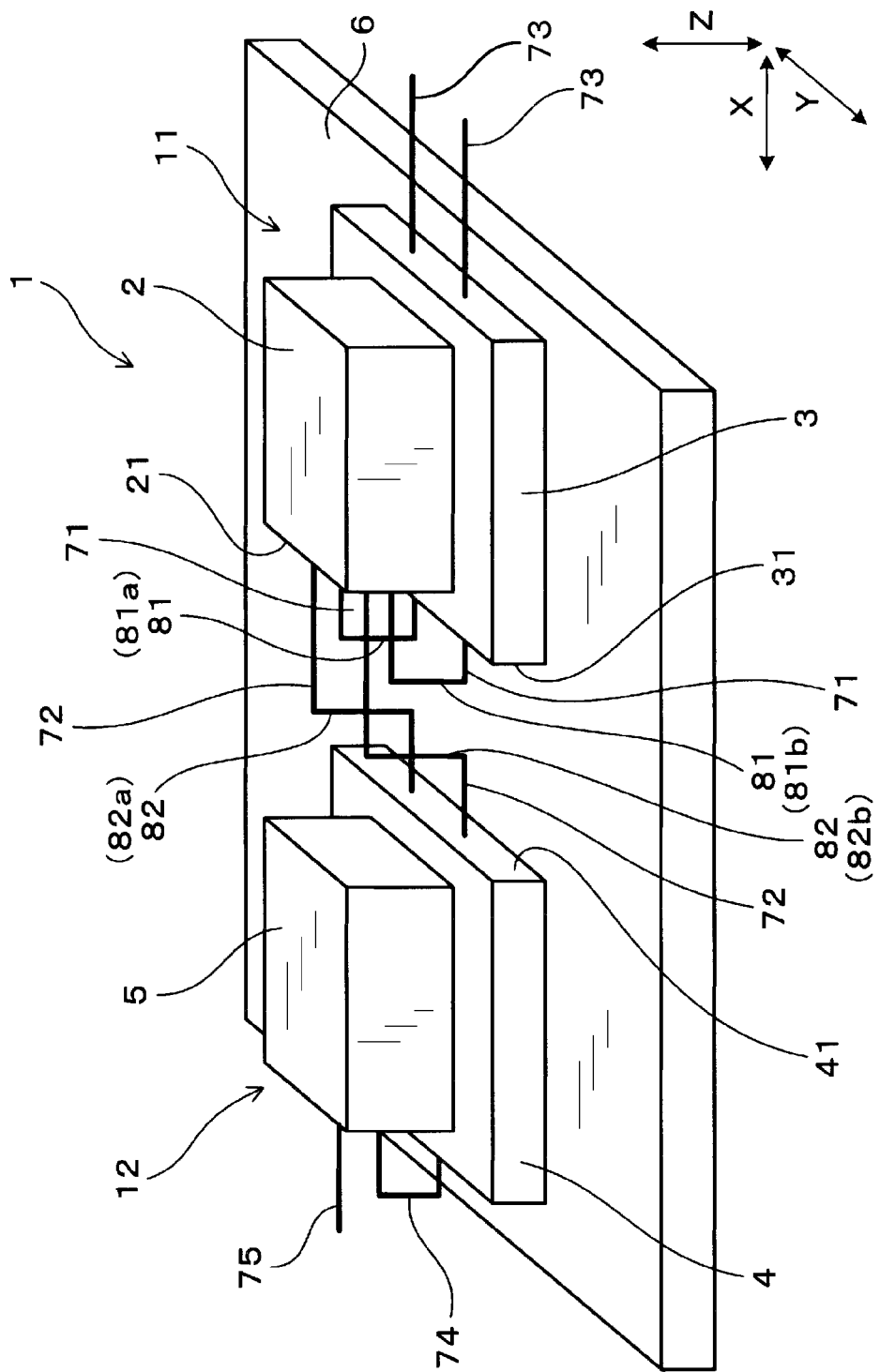
FIG. 2 is a perspective view of the power supply apparatus according to the first embodiment.

As shown in FIG. 1 and FIG. 2, a power supply apparatus 1 includes a transformer 2, a primary side semiconductor component 3, a secondary side semiconductor component 4, a choke coil 5, and a base plate 6.

The transformer 2 has a primary coil and a secondary. The primary side semiconductor component 3 configures a primary side circuit connected to a primary coil side of the transformer 2. The secondary side semiconductor component 4 configures a secondary side circuit connected to a secondary coil side of the transformer 2. The choke coil 5 is connected to the secondary side semiconductor component 4. On the base plate 6, the transformer 2, the primary side semiconductor component 3, the secondary side semiconductor component 4, and the choke coil 5 are mounted.

The transformer 2 and the primary side semiconductor component 3 configure a first stacked body 11 stacked in the normal direction Z of the base plate 6. The secondary side semiconductor component 4 and the choke coil 5 configure a second stacked body 12 stacked in the normal direction Z of the base plate 6.

The power supply apparatus 1 has a pair of first lines 71 connecting the primary side semiconductor component 3 and the transformer 2 to each other, and a pair of second lines 72 connecting the transformer 2 and the secondary side semiconductor component 4 to each other.

The first line 71 and the second line 72 respectively have a first current path 81 and a second current path 82 which are arranged so as to be adjacent to each other and so that currents flow in the normal direction Z of the base plate 6.

As shown in FIG. 2 and FIG. 5, one of and the other of a pair of the second current paths 82 are respectively adjacent to one of and the other of a pair of the first current paths 81 in a second direction X orthogonal to a first direction Y in which the first current paths 81 are adjacent to each other. The first current path 81 and the second current path 82 adjacent to each other in the second direction X are configured so that currents flow therethrough in the directions opposite to each other.

Figure 5A:
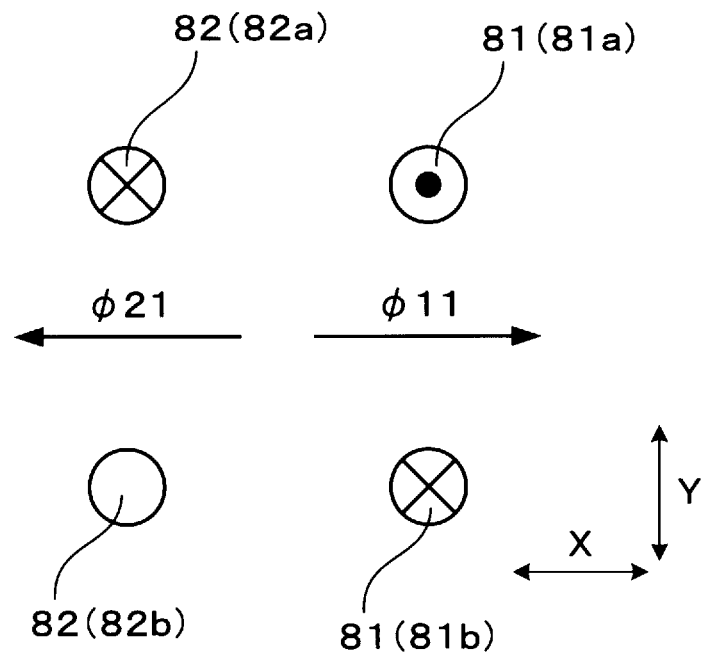
FIG. 5A is an explanatory drawing showing currents flowing through the current paths during a period of time T1 and fluxes produced due to the currents, according to the first embodiment.
Figure 5B:
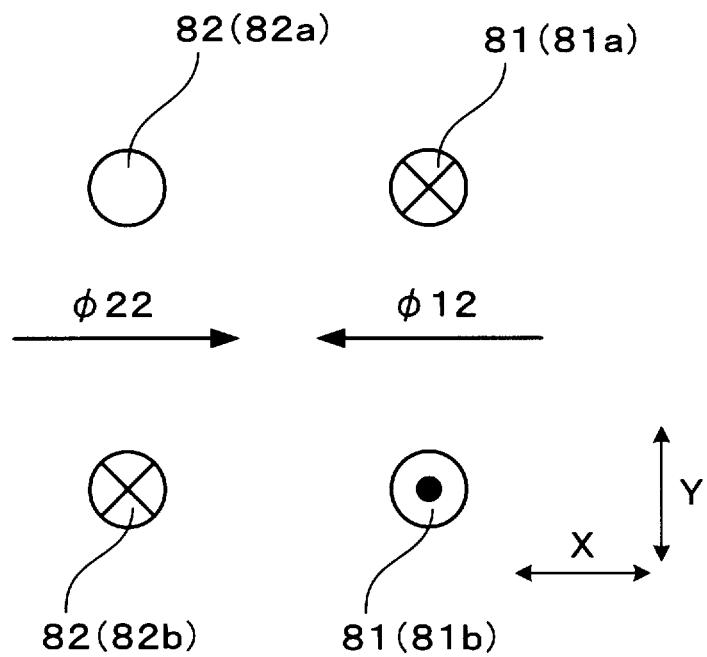
FIG. 5B is an explanatory drawing showing currents flowing through the current paths during a period of time T2 and fluxes produced due to the currents, according to the first embodiment.

That is, one second current path 82a of the pair of the second current paths 82 is adjacent to one first current path 81a of the pair of the first current paths 81 in the second direction X. In addition, the first current path 81a and the second current path 82a are configured so that currents flow therethrough in the directions opposite to each other (FIG. 5A). The other second current path 82b of the pair of the second current paths 82 is adjacent to the other first current path 81b of the pair of the first current paths 81 in the second current path 82. The first current path 81a and the second current path 82a are configured so that currents flow therethrough in the directions opposite to each other (FIG. 5B).

The first direction Y and the second direction X are parallel to the base plate 6. In the present embodiment, the second direction X substantially agrees with the direction in which the first stacked body 11 and the second stacked body 12 are arranged. Parallel to the base plate 6 is not limited to strict parallel, but may be slightly oblique with respect to the base plate 6 if the direction is substantially along the extension direction of the base plate 6.

As shown in FIG. 1 and FIG. 2, the first stacked body 11 is stacked so that the primary side semiconductor component 3 is disposed between the transformer 2 and the base plate 6. The second stacked body 12 is stacked so that the secondary side semiconductor component 4 is disposed between the choke coil 5 and the base plate 6. Note that the base plate 6 can be formed of, for example, metal such as aluminum.

Each of the transformer 2, the primary side semiconductor component 3, the secondary side semiconductor component 4, and the choke coil 5 has a shape of a substantial rectangular parallelepiped. One surface of the primary side semiconductor component 3, which is a substantial rectangular parallelepiped, and one surface of the secondary side semiconductor component 4, which is a substantial rectangular parallelepiped, are opposed to each other. One surface of the transformer 2, which is a substantial rectangular parallelepiped, and one surface of the choke coil 5, which is a substantial rectangular parallelepiped, are opposed to each other. In such a state, the first stacked body 11 and the second stacked body 12 are arranged on the base plate 6.

The first lines 71 and the second lines 72 are drawn from the transformer 2 in the same direction. In the present embodiment, each end of a pair of the first lines 71 and a pair of the second lines 72 is drawn from an opposed surface 21 of the transformer 2, the opposed surface 21 being opposed to the second stacked body 12, and along the direction parallel to the base plate 6. Each of the other ends of the pair of the first lines 71 is drawn from an opposed surface 31 of the primary side semiconductor component 3, the opposed surface 31 facing in the same direction as that in which the opposed surface 21 of the transformer 2 faces, and along the direction parallel to the base plate 6. The first line 71 has a portion formed so as to be parallel to the normal direction Z of the base plate 6 so as to connect between a portion drawn from the transformer 2 and a portion drawn from the primary side semiconductor component 3. The portion serves as the first current path 81.

Each of the other ends of the pair of the second lines 72 is drawn from an opposed surface 41 of the secondary side semiconductor component 4, the opposed surface 41 being opposed to the first stacked body 11. The second line 72 has a portion parallel to the normal direction Z of the base plate 6 so as to connect between a portion drawn from the transformer 2 and a portion drawn from the secondary side semiconductor component 4. The portion serves as the second current path 82.

The first current paths 81 and the second current path 82s are disposed between the first stacked body 11 and the second stacked body 12. The whole of the first lines 71 and the whole of the second lines 72 including portions other than the first current paths 81 and the second current paths 82 are disposed between the first stacked body 11 and the second stacked body 12.

The primary side semiconductor component 3 is connected with a pair of input lines 73, 73 connected to a DC power supply. The choke coil 5 and the secondary side semiconductor component 4 are connected by a DC line 74. The choke coil 5 is connected with an output line 75 connected to a load.

Figure 3:
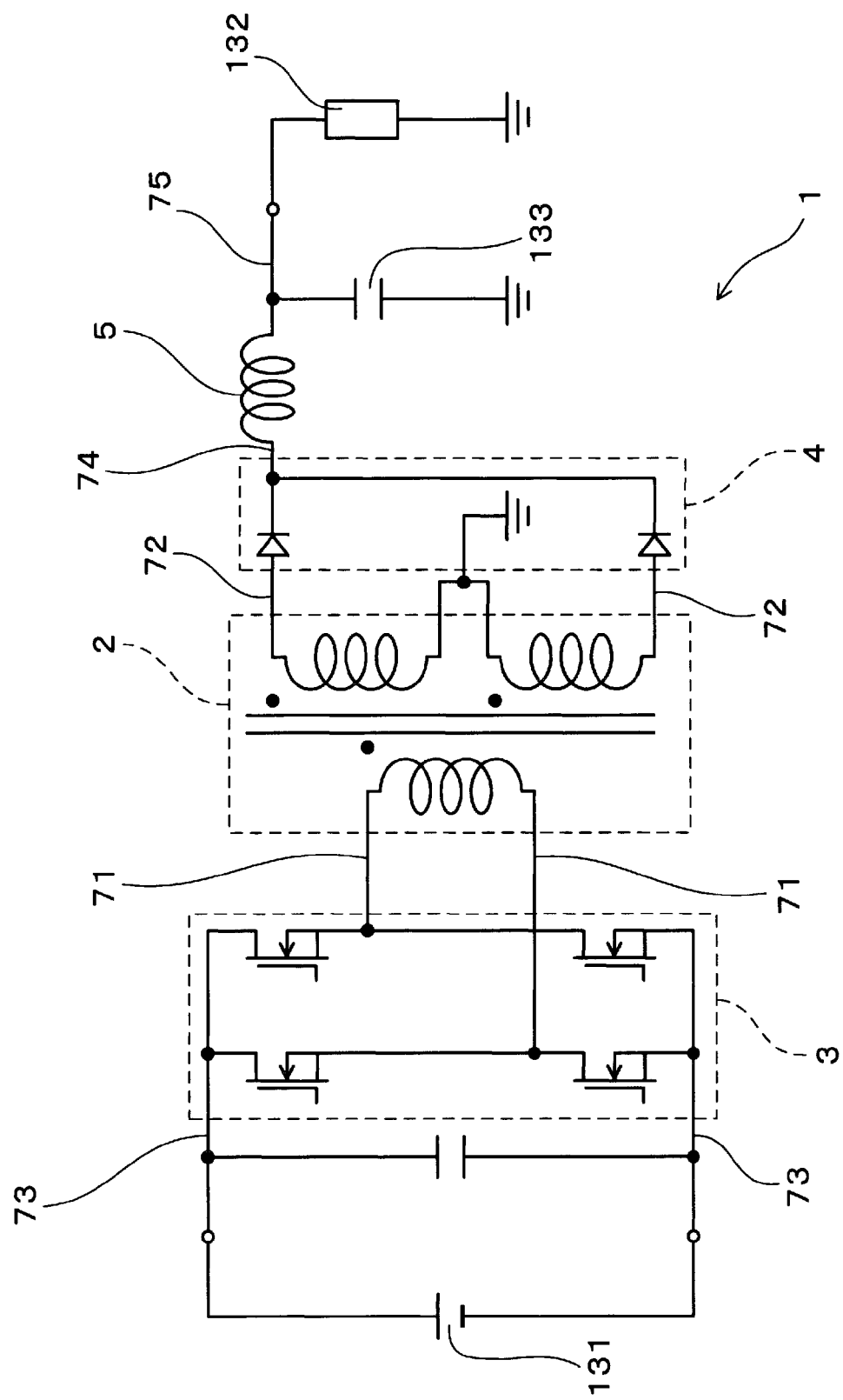
FIG. 3 is a circuit diagram of the power supply apparatus according to the first embodiment.

In the present embodiment, the power supply apparatus 1 is a DC-DC converter, and is installed in, for example, an electric vehicle, or a hybrid vehicle. The power supply apparatus 1 is used to decrease high-voltage DC power of the DC power supply to low-voltage DC power and supply the low-voltage DC power to an accessory battery. That is, as shown in FIG. 3, the power supply apparatus 1 is used in a state of being connected between a DC power supply 131 and a load 132 (accessory battery or the like). The DC power supply 131 is connected with a primary side circuit configured by the primary side semiconductor component 3. A secondary side circuit configured by the secondary side semiconductor component 4 is connected to the load 132 via a smoothing circuit including the choke coil 5.

The primary side circuit configures a switching circuit. The primary side semiconductor component 3 is formed of a semiconductor module including a plurality of switching elements. As the switching element, for example, an IGBT (insulated gate bipolar transistor) or a MOSFET (MOS field effect transistor) can be used. Note that the primary side semiconductor component is not necessarily a semiconductor module, but may be, for example, a discreet semiconductor component.

The secondary side circuit configures a rectification circuit. The secondary side semiconductor component 4 is formed of a diode module including a plurality of diodes. Note that the secondary side semiconductor component may be a semiconductor module including a plurality of MOSFETs. The secondary side semiconductor component may be a discreet semiconductor component.

In addition, the choke coil 5 configures a smoothing circuit in conjunction with a capacitor 133.

The DC power inputted to the power supply apparatus 1 of the present embodiment is converted to AC power by the primary side circuit (switching circuit) and is inputted to the transformer 2. The voltage of the inputted AC power is decreased by the transformer 2, and thereafter is rectified by the secondary side circuit (rectification circuit), thereby becoming DC power. The DC power obtained after the voltage decrease is smoothed by the smoothing circuit, and thereafter is outputted.

Therefore, as shown in a current waveform of FIG. 4A, a current, whose sign (plus and minus) alternately changes in time sequence, flows through the primary coil of the transformer 2. That is, as shown in a current waveform of FIG. 4A, a current, whose sign (plus and minus) alternately changes in time sequence, flows through the first line 71.

Accordingly, an alternating current is generated in the secondary coil of the transformer 2 in synchronized with the current of the primary coil. However, as shown in FIG. 3, the rectification circuit (secondary side semiconductor component 4) is connected to the secondary coil. Hence, the direction of the currents at two secondary terminals (second lines 72, 72) of the transformer 2 is the direction from the transformer 2 to the secondary side semiconductor component 4. As shown in current waveforms of FIG. 4B and FIG. 4C, signs (plus and minus) of the currents are not reversed. Note that the currents intermittently flow through the second lines 72 and alternately flow through the pair of the second lines 72, 72.

Note that FIG. 4B shows a current waveform in one of the second lines 72 (second current path 82a). FIG. 4C shows a current waveform in the other of the second lines 72 (second current path 82b).

As described above, considering that currents, which alternately changes in time sequence, flows through the pair of the first lines 71, 71 and the pair of the second lines 72, 72, the first current paths 81 (81a, 81b) and the second current paths 82 (82a, 82b) are disposed as described above. Note that horizontal axes of the graphs shown in FIGS. 4A, 4B, and 4C indicate time course.

Next, advantages of the present embodiment are described.

In the power supply apparatus 1, the transformer 2 and the primary side semiconductor component 3 configure the first stacked body 11, and the secondary side semiconductor component 4 and the choke coil 5 configure the second stacked body 12. Hence, a space where the transformer 2, the primary side semiconductor component 3, the secondary side semiconductor component 4, and the choke coil 5 are mounted can be decreased in the extension direction of the base plate 6. As a result, decrease in size of the power supply apparatus 1 can be realized.

Making the first stacked body 11 and the second stacked body 12 close to each other on the base plate 6 can effectively decrease the power supply apparatus 1 in size. However, large electromagnetic noise may be produced due to wiring arrangement of the connection lines between the components.

Specifically, since the power supply apparatus 1 has the first stacked body 11 and the second stacked body 12, the first lines 71 and the second lines 72 tend to be configurations having portions through which currents flow in the normal direction Z of the base plate 6.

Hence, first, these portions are arranged so as to be adjacent to each other. That is, as shown in FIG. 2 and FIG. 5, the first lines 71 and the second lines 72 respectively have the first current paths 81 and the second current paths 82 which are arranged so as to be adjacent to each other and are configured so that currents flow in the normal direction Z of the base plate 6. One of the second current paths 82 (second current path 82a) and the other of the second current paths 82 (second current path 82b) are respectively adjacent to one of the first current paths 81 (first current path 81a) and the other of the first current paths 81 (first current path 81b) in the second direction X. The first current path 81 and the second current path 82 adjacent to each other in the second direction X are configured so that currents flow in the directions opposite to each other. Hence, fluxes generated from the respective first current path 81 and the second current path 82 cancel each other. As a result, electromagnetic noise produced from these current paths can be reduced.

This point is described in detail. Each of the numbers of the first lines 71 and the second lines 72 is two. Each of the numbers of the first current paths 81 and the second current paths 82, which are respectively parts of the first lines 71 and the second lines 72, is also two. As shown in FIG. 4A, currents, whose directions are opposite to each other in time sequence, alternately flow through the first current paths 81. As shown in FIGS. 5A and 5b, in any timing, the direction in which a current flows through one of the pair of the first current paths 81 (first current path 81a) and the direction in which a current flows through the other of the pair of the first current paths 81 (first current path 81b) are opposite to each other.

In addition, as shown in FIGS. 4B and FIG. 4C, currents intermittently flow through the second current path 82 in synchronized with current change in the first current path 81. In addition, currents alternately flow in the same direction (the direction from the front to the rear of the paper surface in FIG. 5A and FIG. 5B) through the pair of the second current paths 82 (82a, 82b).

That is, as shown in FIG. 5A, during a period of time T1 in FIG. 4A, FIG. 4B, and FIG. 4C, a current flows through one second current path 82a. The direction in which the current flows is opposite to the direction in which a current flows through the first current path 81a adjacent to the second current path 82a in the second direction X.

Meanwhile, as shown in FIG. 5B, during a period of time T2 in FIG. 4A, FIG. 4B, and FIG. 4C, a current flows through the other second current path 82b. The direction in which the current flows is opposite to the direction in which a current flows through the first current path 81b adjacent to the second current path 82a in the second direction X.

Hence, as shown in FIG. 5A, during the period of time T1, a flux φ11, which is formed so as to penetrate between the pair of the first current paths 81 and 81 due to currents flowing through the pair of the first current paths 81 and 81, is canceled (weakened) by a flux φ21, which is formed due to a current flowing through the second current path 82a.

Similarly, as shown in FIG. 5B, during the period of time T2, a flux φ12, which is formed so as to penetrate between the pair of the first current paths 81 and 81 due to currents flowing through the pair of the first current paths 81 and 81, is canceled (weakened) by a flux φ22, which is formed due to a current flowing through the second current path 82a.

Thus, electromagnetic noise produced from the current paths can be reduced.

In addition, as shown in FIG. 1 and FIG. 2, the first stacked body 11 is configured by the transformer 2 and the primary side semiconductor component 3. The second stacked body 12 is configured by the secondary side semiconductor component 4 and the choke coil 5. Hence, the power supply apparatus 1 can be easily decreased in size.

In addition, the first lines 71 and the second lines 72 are drawn from the transformer 2 in the same direction. Hence, while the lengths of the first lines 71 and the second lines 72 are shortened, the first current paths 81 and the second current paths 82 can easily be arranged so as to be adjacent to each other. In addition, the first current paths 81 and the second current paths 82 are arranged between the first stacked body 11 and the second stacked body 12. Hence, furthermore, while the lengths of the first lines 71 and the second lines 72 are shortened, the first current paths 81 and the second current paths 82 can easily be arranged so as to be adjacent to each other.

As described above, according to the present embodiment, the power supply apparatus can be provided which can be easily decreased in size while reducing electromagnetic noise.

Second Embodiment

Figure 6:
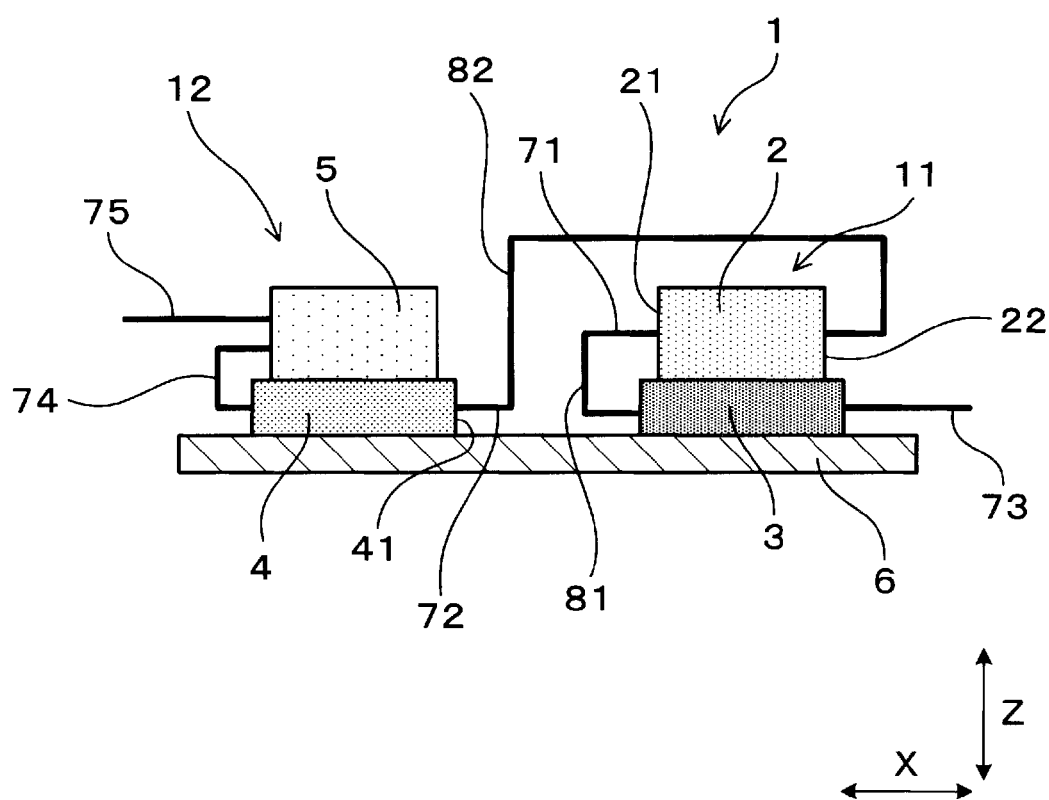
FIG. 6 is an explanatory drawing of a power supply apparatus viewed in the direction parallel to the base plate, according to a second embodiment.

In the present embodiment, as shown in FIG. 6, the power supply apparatus 1 is shown which is configured by drawing the second lines 72 from the opposite surface of the transformer 2 with respect to the second stacked body 12.

That is, the second lines 72 are wired so as to be drawn from a back surface 22 of the transformer 2 opposite to the opposed surface 21 and be bended to reach the opposed surface 41 of the secondary side semiconductor component 4. Note that ends at the secondary side semiconductor component 4 side of the second lines 72 are drawn from the opposed surface 41 of the secondary side semiconductor component 4 toward the first stacked body 11 and in parallel with the base plate 6, as in the case of the first embodiment.

Each of the second lines 72 has a portion parallel to the normal direction Z of the base plate 6 in a space between the first stacked body 11 and the second stacked body 12. This portion serves as the second current path 82 and is disposed so as to be adjacent to the first current path 81 in the second direction X. The positional relationship between the pair of the first current paths 81, 81 and the pair of the second current paths 82, 82 is similar to that of the first embodiment (FIG. 5A, FIG. 5B).

Other configurations are similar to those of the first embodiment. Note that the same reference numerals, which are used in the second embodiment and the drawings concerning the second embodiment, as those used in the first embodiment denote components or the like similar to those of the first embodiment, unless otherwise stated.

The second embodiment also provides the advantages similar to those of the first embodiment.

Third Embodiment

Figure 7:
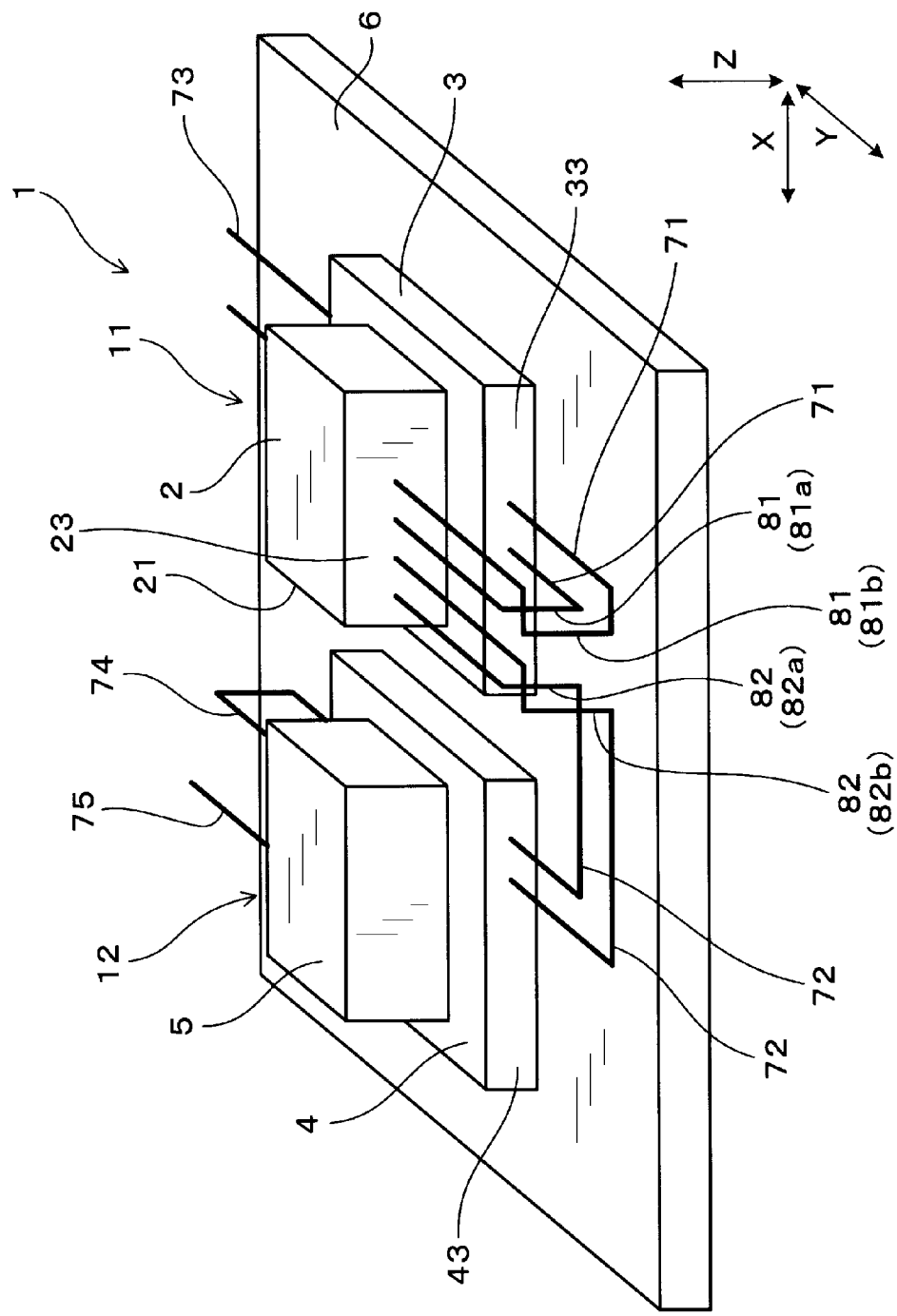
FIG. 7 is a perspective view of a power supply apparatus according to a third embodiment.

In the present embodiment, as shown in FIG. 7, the first current paths 81 and the second current paths 82 are disposed at the positions outside the direction in which the first stacked body 11 and the second stacked body 12 are arranged.

That is, the first current paths 81 and the second current paths 82 are arranged at the positions different from the space between the first stacked body 11 and the second stacked body 12.

In the present embodiment, ends of the pair of the first lines 71, 71 and the pair of the second lines 72, 72 are drawn from a side surface 23 orthogonal to the opposed surface 21 of the transformer 2 and orthogonal to the base plate 6, and in parallel with the base plate 6.

In addition, the other ends of the pair of the first lines 71, 71 and the pair of the second lines 72, 72 are drawn from a side surface 33 of the primary side semiconductor component 3 facing in the same direction as that in which the side surface 23 of the transformer 2 faces, and a side surface 43 of the secondary side semiconductor component 4. The pair of the first lines 71, 71 and the pair of the second lines 72, 72 respectively has the first current paths 81 and the second current paths 82 at the positions opposed to the side surface 23 of the transformer 2 and the side surface 33 of the primary side semiconductor component 3.

The positional relationship between the pair of the first current paths 81, 81 and the pair of the second current paths 82, 82 is similar to that of the first embodiment (FIG. 5A, FIG. 5B). In addition, the second direction X orthogonal to the first direction Y in which the pair of the first current paths 81, 81 are adjacent to each other is parallel to the direction in which the first stacked body 11 and the second stacked body 12 are arranged.

Other configurations are similar to those of the first embodiment. Note that the same reference numerals, which are used in the third embodiment and the drawings concerning the third embodiment, as those used in the first embodiment denote components or the like similar to those of the first embodiment, unless otherwise stated.

According to the third embodiment, the first stacked body 11 and the second stacked body 12 can be closely arranged easily. As a result, the power supply apparatus 1 can be further decreased in size, and the inductance can also be lowered.

In addition, the advantages similar to those of the first embodiment are provided.

Fourth Embodiment

Figure 8:
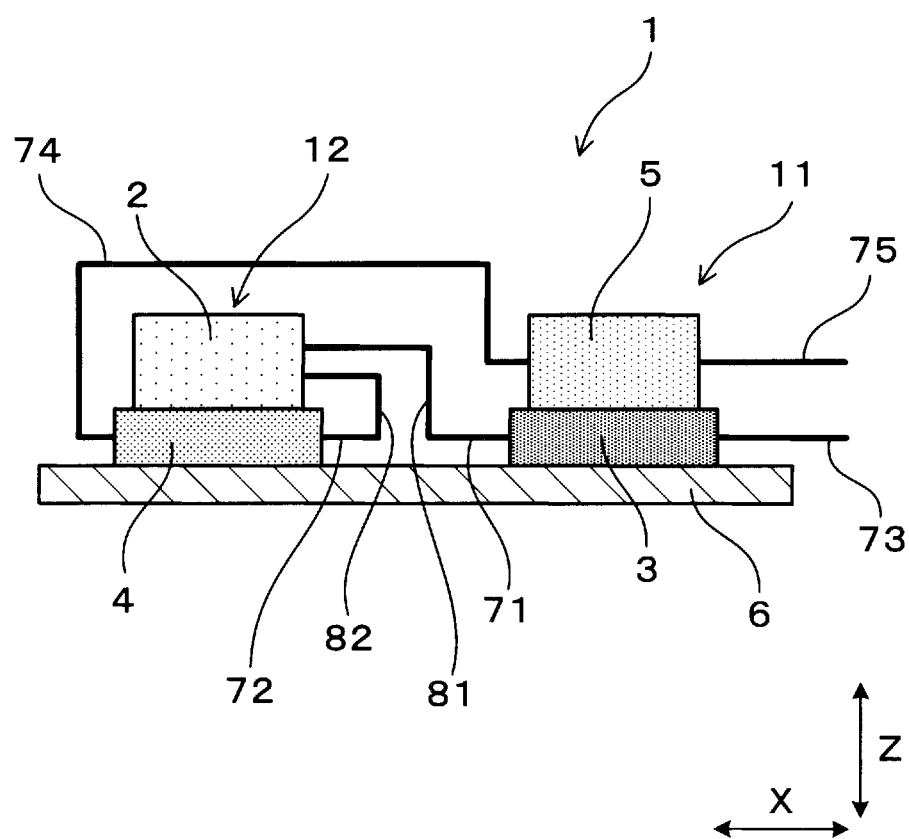
FIG. 8 is an explanatory drawing of a power supply apparatus viewed in the direction parallel to the base plate, according to a fourth embodiment.

In the fourth embodiment, as shown in FIG. 8, the first stacked body 11 is configured by stacking the primary semiconductor component 3 and the choke coil 5, and the second stacked body 12 is configured by stacking the secondary semiconductor component 4 and the transformer 2.

The first stacked body 11 is stacked so that the primary side semiconductor component 3 is disposed between the choke coil 5 and the base plate 6. The second stacked body 12 is stacked so that the secondary side semiconductor component 4 is disposed between the transformer 2 and the base plate 6.

In addition, the pair of the first lines 71, 71 connecting the transformer 2 and the primary side semiconductor component 3 to each other is wired so as to connect the first stacked body 11 and the second stacked body 12. The pair of the second lines 72, 72 connecting the transformer 2 and the secondary side semiconductor component 4 to each other connects components of the second stacked body 12 to each other.

In addition, the pair of the first current paths 81, 81 and the pair of the second current paths 82, 82 are disposed between the first stacked body 11 and the second stacked body 12.

The positional relationship between the pair of the first current paths 81, 81 and the pair of the second current paths 82, 82 is similar to that of the embodiment 1 (FIG. 5). In addition, the second direction X orthogonal to the first direction Y in which the pair of the first current paths 81 are adjacent to each other is parallel to the direction in which the first stacked body 11 and the second stacked body 12 are arranged.

Other configurations are similar to those of the first embodiment. Note that the same reference numerals, which are used in the fourth embodiment and the drawings concerning the fourth embodiment, as those used in the first embodiment denote components or the like similar to those of the first embodiment, unless otherwise stated.

According to the power supply apparatus 1 of the fourth embodiment, the combination of the first stacked body 11 and the combination of the second stacked body 12 are changed from those of the first embodiment. Also according to this configuration, the advantages similar to those of the first embodiment can be provided by properly making the wiring arrangement of the first lines 71 and the second lines 72 and the arrangement of the first current paths 81 and the second current paths 82.

The present invention can implement, in addition to the above embodiments, embodiments in which the arrangement of the first lines and the second lines are properly changed, or the configurations of the first stacked body and the second stacked body are properly changed.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

A power supply apparatus (1) of the embodiment includes: a transformer (2) which has a primary coil and a secondary coil; a primary side semiconductor component (3) which configures a primary side circuit connected to a side of the primary coil of the transformer (2); a secondary side semiconductor component (4) which configures a secondary side circuit connected to a side of the secondary coil of the transformer (2); a choke coil (5) which is connected to the secondary side semiconductor component (4); and a base plate (6) on which the transformer (2), the primary side semiconductor component (3), the secondary side semiconductor component (4), and the choke coil (5) are mounted. Any two of the transformer (2), the primary side semiconductor component (3), the secondary side semiconductor component (4), and the choke coil (5) configure a first stacked body (11) stacked in a normal direction (Z) of the base plate (6), and other two of the transformer (2), the primary side semiconductor component (3), the secondary side semiconductor component (4), and the choke coil (5) configure a second stacked body (12) stacked in the normal direction (Z) of the base plate (6). The power supply apparatus (1) has a pair of first lines (71) connecting the primary side semiconductor component (3) and the transformer (2) to each other, and a pair of second lines (72) connecting the transformer (2) and the secondary side semiconductor component (4) to each other. The first lines (71) and the second lines (72) respectively have a pair of first current paths (81) and a pair of second current paths (82) which are arranged so as to be adjacent to each other and are configured so that currents flow in the normal direction (Z) of the base plate (6). At least one of the pair of the second current paths (82) is adjacent to at least one of the pair of the first current paths (81) in a second direction (X) orthogonal to a first direction (Y) in which the pair of the first current paths (81) are adjacent to each other. The first current paths (81) and the second current paths (82) adjacent to each other in the second direction (X) are configured so that currents flow therethrough in directions opposite to each other.

In the above power supply apparatus, any two of the transformer, the primary side semiconductor component, the secondary side semiconductor component, and the choke coil configure the first stacked body, and other two of the transformer, the primary side semiconductor component, the secondary side semiconductor component, and the choke coil configure the second stacked body. Hence, a space where the transformer, the primary side semiconductor component, the secondary side semiconductor component, and the choke coil are mounted can be decreased in the extension direction of the base plate. As a result, decrease in size of the power supply apparatus can be realized.

Note that making the first stacked body and the second stacked body close to each other on the base plate can effectively decrease the power supply apparatus in size. However, large electromagnetic noise may be produced due to wiring arrangement of the first lines and the second lines, which are connection lines between the components. Specifically, since the power supply apparatus has the first stacked body and the second stacked body, the first lines and the second lines tend to be configurations having portions through which currents flow in the normal direction of the base plate.

Hence, first, these portions are arranged so as to be adjacent to each other. That is, the first lines and the second lines respectively have the first current paths and the second current paths which are arranged so as to be adjacent to each other and are configured so that currents flow in the normal direction of the base plate. In addition, at least one of the second current paths is adjacent to at least one of the first current paths in the second direction orthogonal to the first direction in which the pair of the first current paths are adjacent to each other. In addition, the first current path and the second current path adjacent to each other in the second direction are configured so that currents flow in the directions opposite to each other. Hence, fluxes generated from the respective first current path and the second current path cancel each other. As a result, electromagnetic noise produced from these current paths can be reduced.

As described above, the power supply apparatus can be provided which can decrease in size while reducing electromagnetic noise The power supply apparatus of the above embodiment may be a DC-DC converter which decreases and converts high-voltage DC power of a DC power supply to low-voltage DC power. In addition, the power supply apparatus 1 can be installed in, for example, an electric vehicle, or a hybrid vehicle.

Note that the normal direction is not limited to the direction strictly agreeing with the normal of the base plate, but may be a direction slightly oblique with respect to the strict normal of the base plate.

In addition, the above advantages can be provided when at least one of the pair of the second current paths is adjacent to at least one of the pair of the first current paths in the second direction. However, it is preferable that both of the pair of the second current paths are adjacent to each of the pair of the first current paths in the second direction. That is, it is preferable that one of and the other of the pair of the second current paths are respectively adjacent to one of and the other of the pair of the first current paths in the second direction orthogonal to the first direction in which the pair of the first current paths are adjacent to each other, and the first current paths and the second current paths adjacent to each other in the second direction are configured so that currents flow therethrough in directions opposite to each other. In this case, in the first current paths and the second current paths in which the direction of currents changes in time sequence, fluxes generated from the respective first current path and the second current path can cancel each other in any timing.

What is claimed is:

1. A power supply apparatus, comprising:
    a transformer which has a primary coil and a secondary coil;
    a primary side semiconductor component which configures a primary side circuit connected to a side of the primary coil of the transformer;
    a secondary side semiconductor component which configures a secondary side circuit connected to a side of the secondary coil of the transformer;
    a choke coil which is connected to the secondary side semiconductor component; and
    a base plate on which the transformer, the primary side semiconductor component, the secondary side semiconductor component, and the choke coil are mounted, wherein
    any two of the transformer, the primary side semiconductor component, the secondary side semiconductor component, and the choke coil configure a first stacked body stacked in a normal direction of the base plate, and other two of the transformer, the primary side semiconductor component, the secondary side semiconductor component, and the choke coil configure a second stacked body stacked in the normal direction of the base plate,
    the apparatus has a pair of first lines connecting the primary side semiconductor component and the transformer to each other, and a pair of second lines connecting the transformer and the secondary side semiconductor component to each other,
    the first lines and the second lines respectively have a pair of first current paths and a pair of second current paths which are arranged so as to be adjacent to each other and are configured so that currents flow in the normal direction of the base plate,
    at least one of the pair of the second current paths is adjacent to at least one of the pair of the first current paths in a second direction orthogonal to a first direction in which the pair of the first current paths are adjacent to each other, and
    the first current paths and the second current paths adjacent to each other in the second direction are configured so that currents flow therethrough in directions opposite to each other.

2. The power supply apparatus according to claim 1, wherein
    one of and the other of the pair of the second current paths are respectively adjacent to one of and the other of the pair of the first current paths in the second direction orthogonal to the first direction in which the pair of the first current paths are adjacent to each other, and the first current paths and the second current paths adjacent to each other in the second direction are configured so that currents flow therethrough in directions opposite to each other.

3. The power supply apparatus according to claim 1, wherein
    the first stacked body is configured by the transformer and the primary side semiconductor component, and the second stacked body is configured by the secondary side semiconductor component and the choke coil.

4. The power supply apparatus according to claim 1, wherein the first current paths and the second current paths are drawn from the transformer in the same direction.

5. The power supply apparatus according to claim 1, wherein the first current paths and the second current paths are disposed between the first stacked body and the second stacked body.

6. The power supply apparatus according to claim 1, wherein the first current paths and the second current paths are disposed at positions outside a direction in which the first stacked body and the second stacked body are arranged.

* * * * *